(12) United States Patent
Hunter et al.

(10) Patent No.: US 7,071,978 B2
(45) Date of Patent: Jul. 4, 2006

(54) IMAGE MOSAIC DATA RECONSTRUCTION

(75) Inventors: Andrew Arthur Hunter, Bristol (GB); Stephen B Pollard, Gloucestershire (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1016 days.

(21) Appl. No.: 09/906,625

(22) Filed: Jul. 18, 2001

(65) Prior Publication Data
US 2003/0025814 A1    Feb. 6, 2003

(51) Int. Cl.
  *H04N 9/07*  (2006.01)
  *H04N 9/68*  (2006.01)
(52) U.S. Cl. .................... 348/266; 348/235
(58) Field of Classification Search ............ 348/222.1, 348/234, 235, 252, 266, 272, 273, 280, 281
  See application file for complete search history.

(56) References Cited

U.S. PATENT DOCUMENTS

| 4,176,313 | A | 11/1979 | Wrinn |
| 4,642,678 | A | 2/1987 | Cok |
| 5,357,354 | A | 10/1994 | Matsunawa et al. |
| 5,629,734 | A | 5/1997 | Hamilton, Jr. et al. |
| 5,771,318 | A | 6/1998 | Fang et al. |
| 5,847,755 | A | 12/1998 | Wixson et al. |
| 6,084,593 | A | 7/2000 | Gibson |
| 6,301,384 | B1 | 10/2001 | Webb |
| 6,366,319 | B1 * | 4/2002 | Bills ......................... 348/273 |
| 6,415,053 | B1 * | 7/2002 | Norimatsu .................. 382/199 |
| 6,493,029 | B1 * | 12/2002 | Denyer et al. .............. 348/236 |
| 6,842,191 | B1 | 1/2005 | Smith |

FOREIGN PATENT DOCUMENTS

| EP | 0930789 A2 | 7/1999 |
| EP | 0996293 A2 | 4/2000 |

OTHER PUBLICATIONS

Ozawa and Takahashi, "A Correlative Coefficient Multiplying (CCM) Method for Chrominance Moire Reduction in Single-Chip Color Video Cameras," *IEEE Transactions on Electron Devices*, vol. 38, No. 5 (May 1991), pp. 1217-1225.
Gonzalez and Woods, "Digital Image Processing," Addison-Wesley (Reading, Mass.) 1993, pp. 189-201.

* cited by examiner

*Primary Examiner*—Tuan Ho
*Assistant Examiner*—Timothy J. Henn

(57) ABSTRACT

This invention relates to the reconstruction of a full colour image from image mosaic data in particular where the image mosaic data is unequally weighted between different colours. The image mosaic is composed of a plurality of image pixels. Each image pixel has one of at least three colour values and has a luminance value representing the intensity of the colour value for that pixel in the image mosaic. The pixels of each colour value are interleaved across the image mosaic with pixels of different colour values to form the image mosaic. For each colour value, both a low spatial frequency monochrome image and a high spatial frequency luminance image are generated, the high spatial frequency luminance image extending only across pixels locations of the image mosaic for that colour value. Each of the high spatial frequency luminance images is then combined with a corresponding low spatial frequency monochrome image to form the full colour image.

20 Claims, 5 Drawing Sheets

Black and White

RGB Mosaic

IMAGE MOSAIC DATA RECONSTRUCTION

This invention relates to the reconstruction of a full colour image from image mosaic data, in particular where the image mosaic data is unequally weighted between different colours.

Colour image sensors often capture an image using an array of photodetector elements, each of which is sensitive to a particular colour or range of colours. For example an image sensor may have a rectangular array of detector elements, covered by a matching array of red, green and blue filters. One common pattern is called a Bayer pattern, which has twice as many green detector elements as red or blue elements.

The captured image data is a mosaic of red, green and blue elements represented by three corresponding data sets. When a colour image is captured by such a detector, it is necessary to interpolate each colour to fill in the captured image data to cover sensor locations where there was no sensor for that colour.

After interpolation, each detector element location, or pixel, has associated with it image data for each of the colours, following which the image data can be stored or processed according to the needs of a particular imaging application.

A simple method for generating the full colour image from image mosaic data is to use bilinear de-mosaicing. By this method, each of the data sets is processed independently.

New red values (at the positions of blue and green mosaic elements) are interpolated from the values of nearby red mosaic elements. New blue values (at the positions of red and green mosaic elements) are interpolated from the values of nearby blue mosaic elements. New green values (at the positions of red and blue mosaic elements) are interpolated from the values of nearby green mosaic elements.

This method suffers from two main problems. The first is that each of the interpolated data sets of the final de-mosaiced image contains no more detail than was available in the original mosaic elements of the same single colour. So the red and blue data sets derived from a Bayer mosaic only have one quarter of the maximum achievable resolution, and the green data set only has half of the maximum resolution. The second problem is that fine details in an image may give artificially strong or weak responses in a particular data set depending upon whether or not the details fell on or missed pixels of that colour. This gives rise to conspicuous colour aliasing.

A better method is described in U.S. Pat. No. 4,176,373. This describes a colour camera system in which a higher sample rate is used for the green data set than for the red and blue data sets. The two sample rates are analogous to the two rates of occurrence of green and red/blue filters in the Bayer pattern. The difference between the higher sample rate green channel and a down sampled version of the green channel (to match the sample rates of the red and blue channels) is then added to the red and blue channels. Thus, this method generates a high frequency luminance signal (approximated by the high frequencies of the green channel) and adds it to the low frequency chrominance (approximated by the low frequency red and blue channels). This method avoids additional colour aliasing and preserves detail from the green channel, adding the detail to the other two channels. It does not reduce colour aliasing in the original samples and does not exploit detail from the red and blue channels, which together would typically contribute half of the original resolution.

Another method that produces better results than the bilinear method is described in U.S. Pat. No. 4,642,678. When this method is applied to a Bayer mosaic, a complete green data set is first derived by bilinear interpolation from the mosaic data. Instead of interpolating the values of red and blue mosaic elements to fill in the other colour channels as for the bilinear method, the ratios are calculated of the values of the red or blue mosaic elements to the interpolated green data set values at those points. The ratios themselves are interpolated to relate the red and blue values to the green values across the whole array. The missing red and blue values are then derived from the interpolated ratios and the green data set values at each point of the array. This method generates red, green and blue values at each pixel location without contributing to colour aliasing effects, but it does nothing to reduce the colour aliasing that may have been present in the original mosaic data. Also, most of the image detail comes from the green data set, but due to interpolation this has only half of the desired maximum achievable resolution.

It is an object of the current invention to provide a more convenient and economical apparatus and method for reconstructing a full colour image from image mosaic data.

According to the invention, there is provided a method of de-mosaicing an image mosaic to form a full colour image, the image mosaic being composed of a plurality of image pixels and each image pixel having one of at least three colour values and having a luminance value representing the intensity of the colour value for that pixel in the image mosaic, the pixels of each colour value being interleaved across the image mosaic with pixels of different colour values to form the image mosaic, the method comprising the steps of:
i) for each colour value, generating from the pixels for that colour value a low spatial frequency monochrome image;
ii) for each colour value, generating from the pixels for that colour value a high spatial frequency luminance image that extends only across pixels locations of the image mosaic for that colour value;
iii) combining each of the high spatial frequency luminance images with a corresponding low spatial frequency monochrome images to form the full colour image.

Combination of high spatial frequency luminance images with corresponding low spatial frequency monochrome images may advantageously be by simple addition, though alternative combinations to achieve the same functional goals can be envisaged.

Also according to the invention, there is provided a device for de-mosaicing an image mosaic to form a full colour image, the device comprising a processor, software, and a memory, in which the memory stores image mosaic data representative of an image mosaic having a plurality of image pixels, said image mosaic data including for each pixel one of at least three colour values and a luminance value representing the intensity of the colour value for that pixel in the image mosaic, the pixels of each colour value being interleaved across the image mosaic with pixels of different colour values to form the image mosaic, wherein the processor, software and memory are operable to:
a) generate from the image mosaic data, for each colour value, smoothed image data representative of a low spatial frequency monochrome image;
b) generate from the image mosaic data, for each colour value, image data representative of a high spatial frequency image for that colour value that extends only across pixels locations of the image mosaic for that colour value;

c) combine the high frequency image data with the smoothed image data for each colour value to form de-mosaiced image data representative of the full colour image.

In some applications it may be convenient if the low spatial frequency monochrome image is calculated for the full image so that this extends across all pixel locations of the image mosaic. It is possible, however, to reduce memory and processing requirements by performing this smoothing calculation just at the pixel locations for that colour value to generate a low resolution smoothed image. In the case of an image mosaic composed with the Bayer pattern, the red smoothed image would then extend only across one quarter of the pixel locations, with a corresponding reduction in the memory requirement.

Since the smoothed image is only an intermediate image used in the generation of the de-mosaiced image, it is also possible to generate this smoothed image piecemeal as required for different portions of the full image during the de-mosaicing process. In the case of a large image mosaic, de-mosaicing sequentially different portions of the full image in this way reduces the maximum memory requirement.

In any event, the high frequency component of each mosaic pixel is combined with the other two low frequency channels for that pixel to generate the two missing colours. Thus the high frequency signal may be considered to be essentially an achromatic signal, with all colour components having the same magnitude, that is combined with the low frequency monochrome signal for each colour value.

Because this method combines high frequency information from each colour with the low frequency components of the other colours, it retains and combines details from all the source pixels. Also, because this method adds achromatic high frequencies back into low frequency versions of the original signals, there may for many images be a reduction any colour aliasing that was present in the original mosaic data.

The method works best when the luminance values of at least half of the adjacent pixels in the image mosaic are substantially the same. In many applications, such as document imaging, this is indeed the case.

Optionally, additional gain may be applied to the high frequency image prior to combining this with the smoothed image data for each colour value. This has the effect of boosting the definition of high frequency components in the de-mosaiced image (i.e. sharpen), with only minimal additional computational complexity.

It may be most convenient if the method includes the step of combining the three or more high spatial frequency images to form a high spatial frequency luminance image that extends across all pixel locations of the image mosaic. The high frequency image data from the three or more colour values then form composite image data representative of a high spatial frequency luminance image that extends across all pixel locations of the image mosaic. This composite high frequency image data can then be combined with each of the low frequency monochrome images to generate the full colour image.

In a preferred embodiment of the invention, the method comprises the steps of:
iv) forming a plurality of mosaic data sets, one for each colour value, and each such data set comprising elements that represent the luminance values of the pixels which have the corresponding colour value;

v) generating from each image mosaic data set, a smoothed image data set representative of the corresponding low spatial frequency monochrome image, and each such data set comprising elements that represent smoothed luminance values across all pixel locations of the image mosaic;

vi) generating from each image mosaic data set, an image data set representative of the corresponding high spatial frequency image, and each such data set comprising elements that represent high frequency luminance values of the pixels which have the corresponding colour value;

vii) combining each high frequency image data set with a smoothed image data set to form a plurality of de-mosaiced image data sets, one for each colour value, and each such data set comprising elements that represent de-mosaiced luminance values of the pixels which have the corresponding colour value.

Usually, there will be three colour values, namely red, green and blue, and there is a predominance of pixels having a green colour value. In a preferred embodiment of the invention, the colour values of pixels in the image mosaic are arranged in a Bayer pattern.

The invention will now be described in further detail, by way of example with reference to the following drawings.

Figure 1:
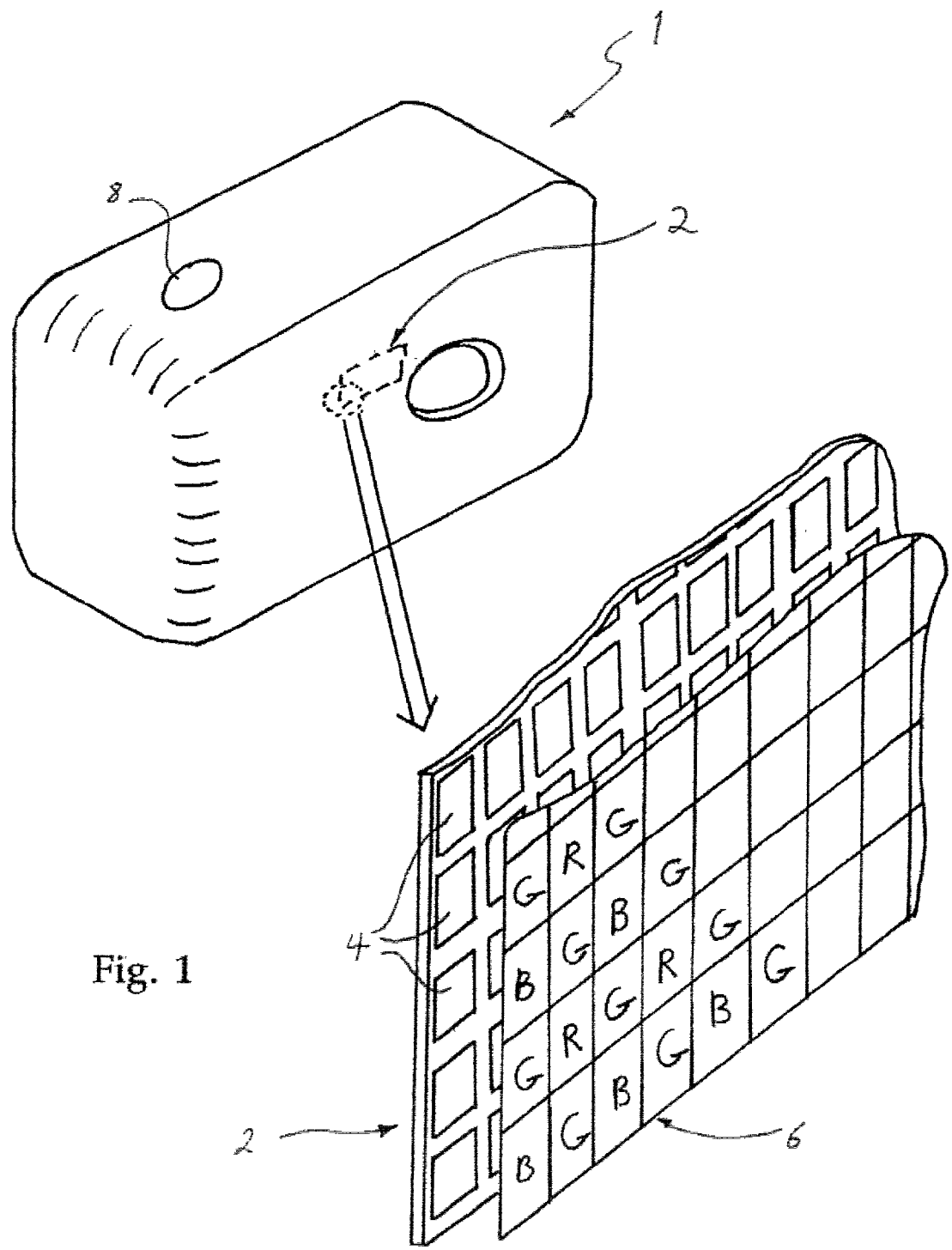
FIG. 1 shows schematically some of the internal components of a conventional electronic camera, including a colour sensor array having red, green and blue (RGB) imaging elements.

FIG. 1 shows one example of a consumer imaging device, here a hand-held digital camera 1. Such cameras have a colour image sensor 2 having a two-dimensional regular array of imaging elements or pixels 4. A typical consumer sensor array may have up to 4 Megapixels resolution, arranged in a rectangular array 2500 pixels wide and 1600 pixels high.

The imaging elements are sensitive to light across a wide spectrum of colours, and so the sensor array 2 is overlain by a mosaic-like pattern of colour filters 6. There are usually only three such colours, red (R), green (G) and blue (B), (RGB) and the colours are usually interleaved in a repeating pattern across the sensor array 2. Thus, the array elements 4 under each colour of filter 6 are sensitive only to light with wavelengths passed by each corresponding filter 6.

Many filter patterns exist, but the most common is the Bayer filter pattern. This consists of pixels with colour filters arranged in a rectangular grid pattern as set out below:

```
G R G R ... G R G R
B G B G ... B G B G
G R G R ... G R G R
...
B G B G ... B G B G
G R G R ... G R G R
B G B G ... B G B G
``` where R, G and B represent red, green and blue colour filters respectively. For the Bayer pattern, there is a preponderance of green pixels in the sensor array, with these contributing half of the full sensor resolution, while the red and blue pixels each contribute one quarter of the resolution.

Figure 2:
FIG. 2 shows an example of original black and white text to be imaged by a colour sensor array such as that in FIG. 1.
Figure 3:
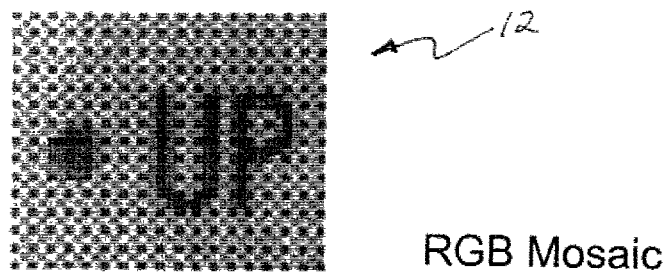
FIG. 3 shows the text when captured as an RGB mosaic image.

FIG. 2 shows an example of original black and white text 10, consisting of the symbols "●UP", to be imaged by the digital camera 1. The text 10 is part of a larger document (not shown) that is to be imaged in a desktop document imaging application. FIG. 3 shows how the text 10 is imaged as an RGB mosaic 12 within a small portion of the sensor array 2 consisting of 35 pixels in a horizontal direction and 29 pixels in a vertical direction.

Figure 4:
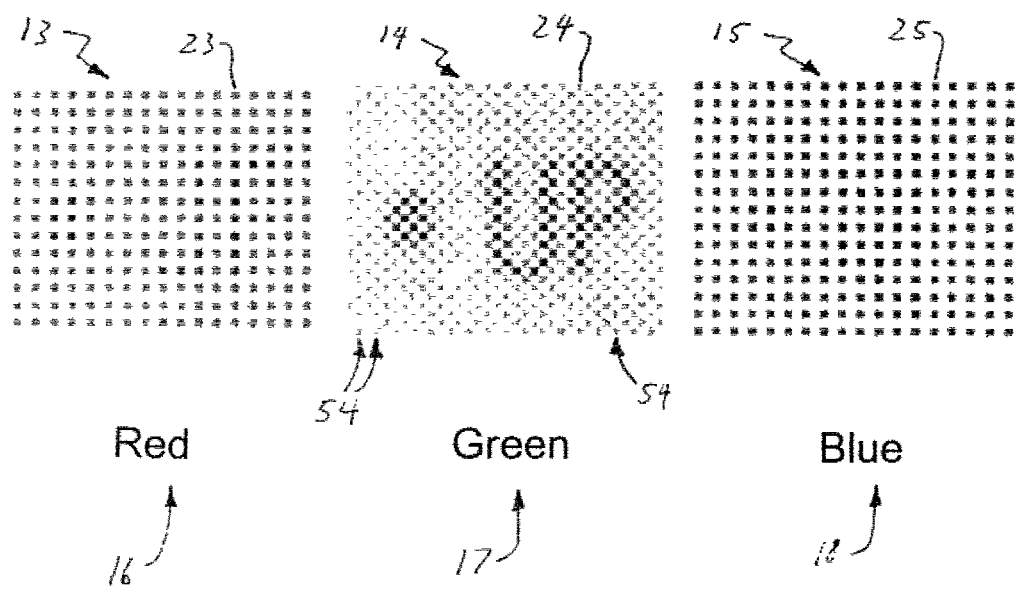
FIG. 4 shows the arrangement of red, green and blue pixels in the image mosaic of FIG. 3.

The Bayer pattern can be seen most clearly in FIG. 4, which shows for the three colour values red 16, green 17 and blue 18, that there are twice as many green pixels 14 as red pixels 13 or blue pixels 15. The original text 10 is visible as different luminance levels of the pixels 13,14,15.

Figure 5:
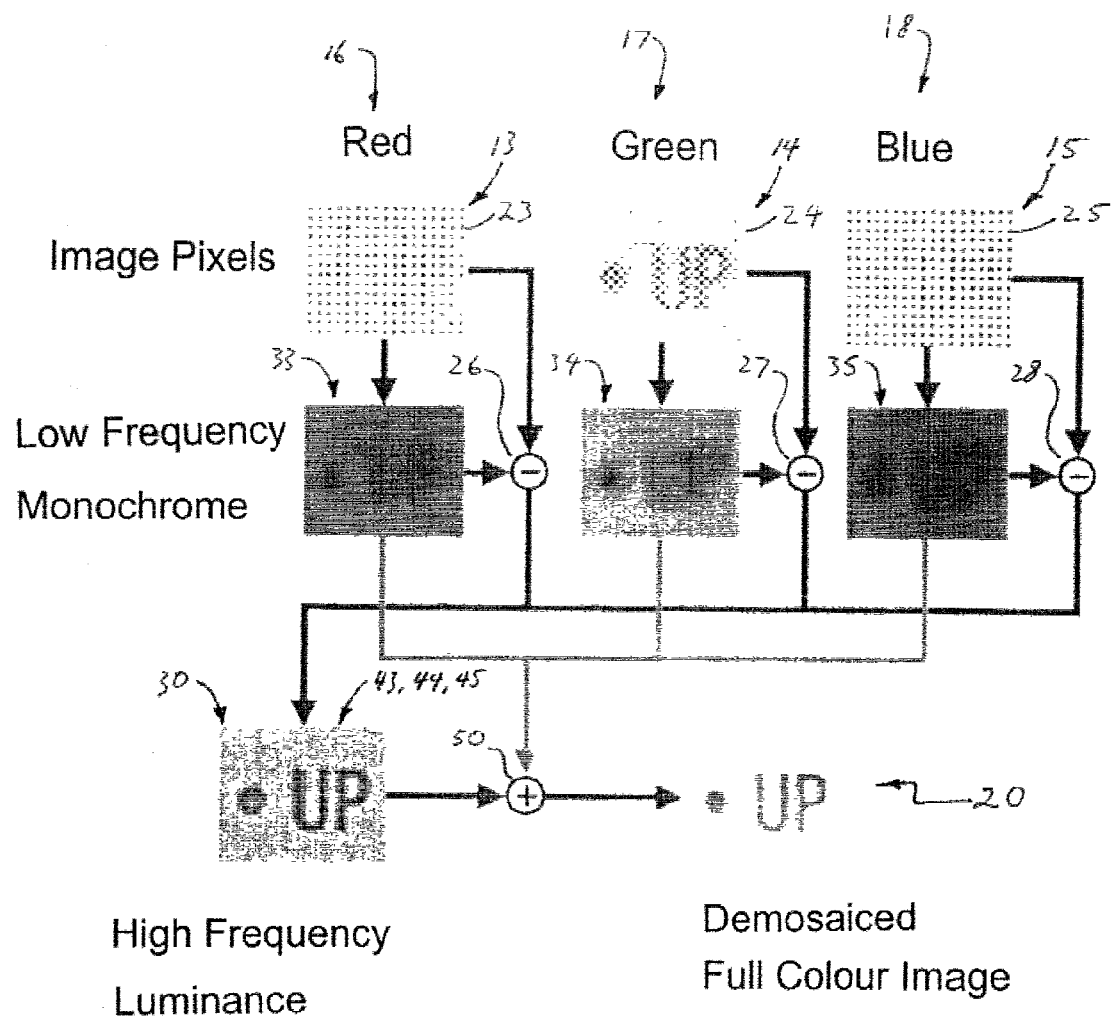
FIG. 5 shows schematically how the red, green and blue pixels are processed in a method according to the invention to yield a de-mosaiced full colour image.

FIG. 5 shows schematically how the image mosaic 12 is processed to yield a de-mosaiced full colour image 20. First, for each colour value 16,17,18, a low spatial frequency image 33,34,35 is formed. Then, for each of the three colour values 16,17,18, a difference is taken 26,27,28 between the luminance level of each individual pixel 13,14,15 for that particular colour value 16,17,18, and a corresponding point of the low spatial frequency image of the same colour value. This difference 26,27,28 is used to generate an achromatic high frequency image which when combined with similar differences for the other two colour values results in a composite achromatic high frequency image 30 that extends across all pixels locations in the original RGB image mosaic 12.

Therefore, the resulting composite image 30 is a black and white high frequency version of the original RGB image 12. Most conveniently, the high frequency image 30 consists of three sets of high frequency image pixels 43,44,45 at locations in the composite image 30 that correspond with the locations of corresponding sets of pixels 13,14,15 in the original RGB mosaic image 12. As can be seen in FIG. 5, these pixels 43,44,45 have different luminance values.

Then, for each high frequency pixel 43,44,45, the achromatic high frequency luminance value is added 50 to a corresponding portion of each of the three low spatial frequency images 33,34,35, which results in a de-mosaiced full colour image 20.

This method has the advantage of being relatively easy to compute in electronic hardware, while still giving good reconstructed image quality.

The process described above can be represented mathematically as follows. Let the low spatial frequency versions of the red R, green G and blue B pixels 13,14,15 be labelled $R_S$, $G_S$ and $B_S$ respectively, where the subscript letter "S" stands for "smoothed". Each of the low spatial frequency monochrome images 33,34,35 is formed by two-dimensional interpolation (to fill in missing pixel locations) combined with low pass spatial filtering (examples of spatial filters including low pass or smoothing filters are given in Digital Image Processing, by Gonzalez and Woods, pages 189 to 201, Addison & Wesley, 1992). Here, the smoothed images 33,34,35 are formed individually for each of the three colour values 16,17,18 using bilinear interpolation and block averaging. All three smoothed images 33,34,35 then extend across locations corresponding with all elements of the RGB mosaic pattern 12.

In the preferred embodiment of the invention, the high frequency component of each mosaic pixel (given by subtracting the original mosaic value from the smoothed value of the same colour at the same point) is added to the values of the other smoothed colours for that pixel in order to generate the other two missing colours as below.

| At a Red Pixel | At a Green Pixel | At a Blue Pixel |
|---|---|---|
| $G = G_S + R - R_S$ | $R = R_S + G - G_S$ | $R = R_S + B - B_S$ |
| $B = B_S + R - R_S$ | $B = B_S + G - G_S$ | $G = G_S + B - B_S$ |

To reduce the computation required for the de-mosaicing process, it is possible to reduce the number of mosaic pixel locations at which the mosaic pattern is spatially filtered to produce the low spatial resolution images. This results in smoothed images with lower spatial frequencies than might otherwise be the case (unless the degree of smoothing is itself reduced to accommodate the change in spatial resolution), but at no great ultimate loss in information content, for the reason that image details are reintroduced by adding the high frequencies as described above. Preferably, low pass images are computed only for a subset of the green pixels 14, for example as shown in FIG. 4 those green pixels in columns 54 (or alternatively rows) having both green pixels 14 and red pixels 13. For the Bayer pattern, this requires one quarter of the computation while the image quality remains almost constant.

For red and blue pixels this amounts to avoiding the initial interpolation stage and operating the smoothing on images formed from the raw red and blue pixels alone.

Performing image smoothing at the lower spatial resolution necessitates the need to generate intermediate smoothed intensity values for those pixel locations that have been excluded from the smoothing process. Preferably this can be achieved by explicitly interpolating (bi-linearly) smoothed green, red and blue pixels to the full mosaic resolution prior to subsequent operations. During this process, it is particularly advantageous to allow for the relative offset of the different low resolution colour pixel planes during the interpolation process in order to reduce or eliminate zippering effects. This is achieved by offsetting each interpolated smooth colour plane according to the position of the pixel plane (used to construct the low resolution version) within the Bayer pattern.

Therefore, each of the high spatial frequency images 44,45,46 is formed for each of the colour values 16,17,18 from the difference 26,27,28 between the luminance values of the image mosaic pixels 16,17,18 for that colour value and corresponding portions of the low spatial frequency monochrome image 33,34,35 for that same colour value 16,17,18.

In other words, the high frequency component of each mosaic pixel is given by subtracting the mosaic value from the corresponding location of a low frequency version of the image for the same colour value.

The de-mosaiced full colour image 20 is then formed for each of the colour values 16,17,18 by summing the high spatial frequency image 30 with each of the low spatial frequency monochrome images 33,34,35.

It is, however, optionally possible at only a small incremental computational expence, to perform some degree of additional sharpening by modifying the high frequency image 30 prior to full reconstruction 50 of the de-mosaiced image 20. The easeiest way to do this is to apply an overall sharpening gain, for example a linear multiplication of all elements in the high frequency image. Alternatively non-linear sharpening can be implemented by way of a look up table applied to the elements of the high frequency image 50.

Figure 6:
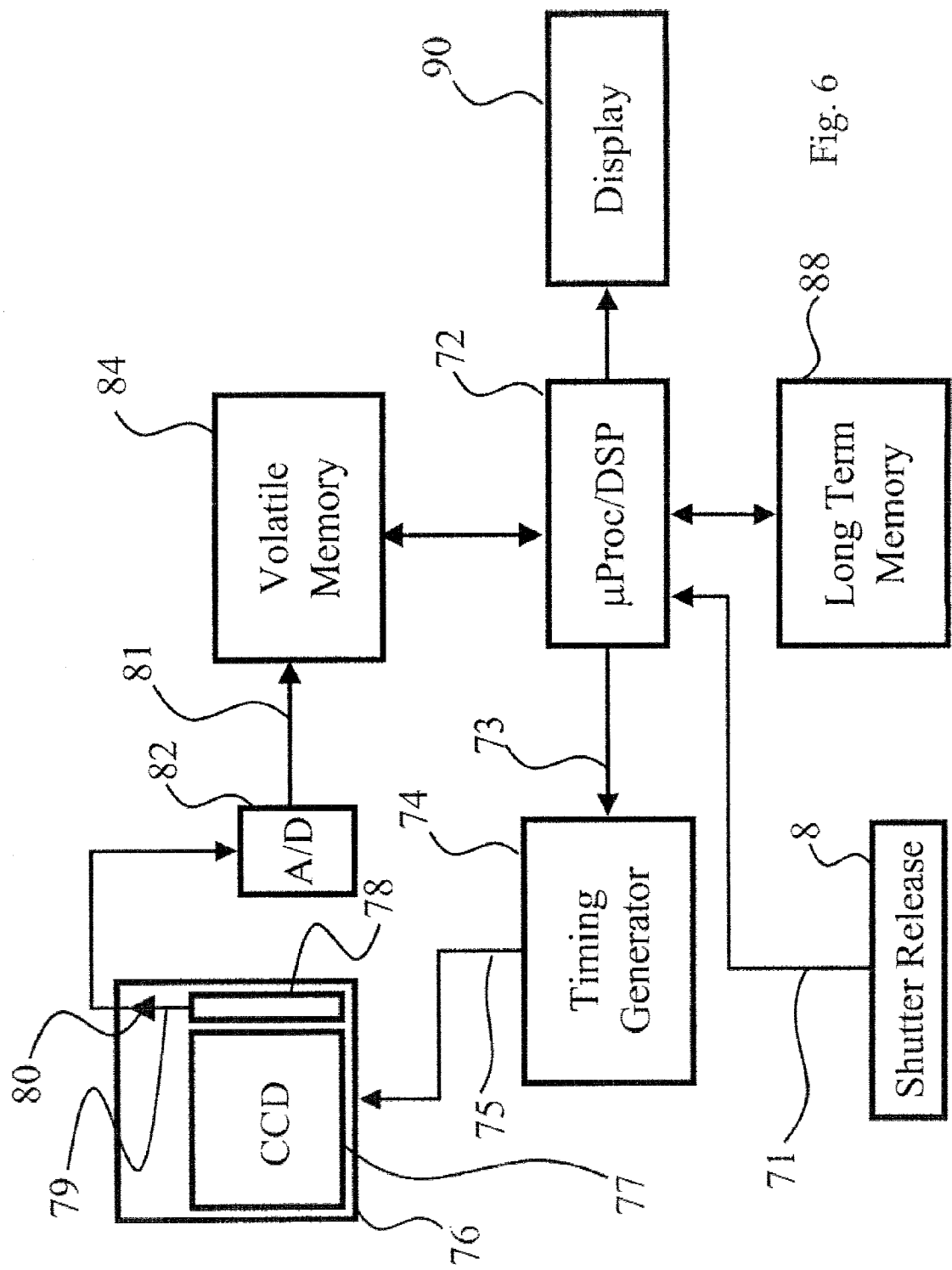
FIG. 6 is a circuit schematic diagram from a device according to the invention for de-mosaicing an image mosaic to form a full colour image, the device comprising a processor, software, and a memory.
Figure 7:
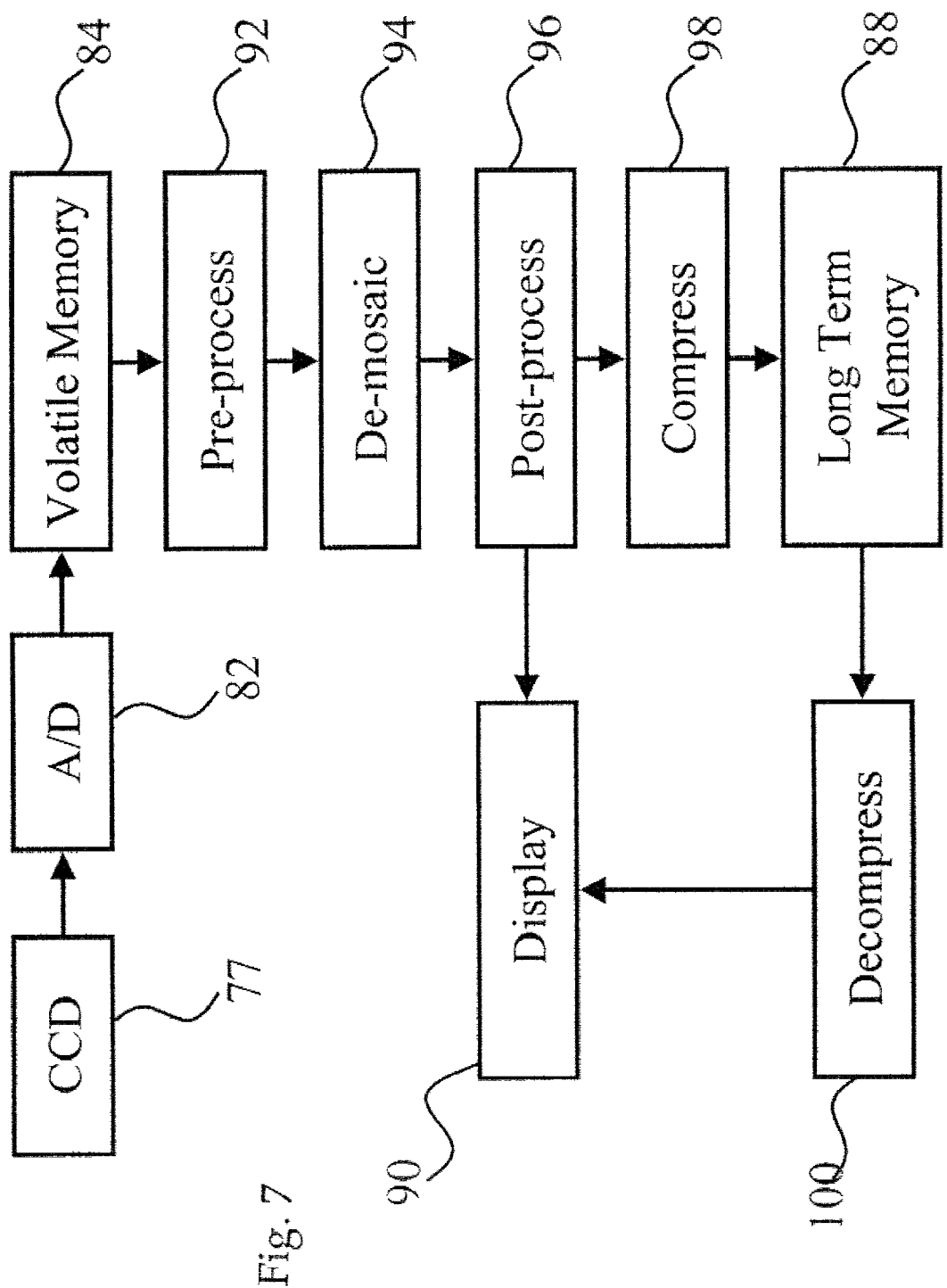
FIG. 7 is a flow chart illustrating a preferred embodiment of the method according to the invention for de-mosaicing an image mosaic to yield a full colour image.

This process may be readily implemented in hardware, illustrated in block schematic form in FIG. 6, and illustrated in the flowchart of FIG. 7.

A shutter release mechanism 8 when activated by a user sends a signal 71 to a microprocessor unit 72, which may include a digital signal processor (DSP). The microprocessor then sends an initiation signal 73 to a timing generator 74, whereupon the timing generator sends a trigger signal 75 to an electronic image sensor unit 76.

The sensor 76 consists of an imaging area 77 consisting of an array of sensing elements (typically either of a photogate or alternatively photodiode construction) and a serial readout register 78 from where an analogue signal 79 is generated via an amplifier 80. This signal 79 is generated upon receipt by the sensor unit 76 of the trigger signal 75.

The amplified analogue signal 79 is converted to a digital signal 81 by an A/D unit 82. The resulting raw digital image data is stored temporarily in a volatile memory 84.

Image processing according to the present invention can then be performed by the microprocessor unit 72. The microprocessor may include additional DSP capability in the form of specialised block of hardware to carry out specific functions or an additional more general DSP co-processor.

The processing itself may be performed according to the steps outlined in the flow-chart of FIG. 7. These include a pre-processing stage 92, which may typically include correction of the OECF (opto-electronic conversion function) of the sensor and white-balancing to compensate for variations in illumination. Following the de-mosaicing stage 94 described above, a subsequent post-processing stage 96 may include exposure correction (which can also be accomplished at the pre-processing stage) and transformation to a standard colour space such as sRGB (as described in IEC 61966-2-1). Finally the reconstructed RGB image data can be compressed 98 and stored in long term memory 88 using a standard image compression scheme such as the ubiquitous JPEG scheme.

Additionally a display device 90 may be incorporated into the design. Images can be displayed live to facilitate view-finding or reviewed from long term memory requiring an additional decompress processing stage 100.

Although a preferred embodiment of the invention has been described with reference to the Bayer pattern of image pixels, the invention is applicable to cases where not all rows and/or columns contain image pixels of at least two colours. For example, some mosaics have pure green rows or columns interleaved with red/blue rows or columns. The invention is equally applicable to such image mosaics.

It is not strictly necessary to store the whole raw image frame in volatile memory. The image processing can be performed on the fly, thus requiring only as much memory as is necessary to perform the imaging pipeline. So after the first few rows of image data have been read from the sensor into memory it is possible to generate compressed image data for the start of the image and begin storing these in long term memory. This results from the fact that all processes are essentially local and operate only on a limited area of the image.

In other words, although the "images" constructed at each stage of the process could be complete sets of data that extend across the entire image, in practice this adds cost in terms of memory and possible throughput. Therefore, the "images" used at each stage of the process will in general be created piecemeal, with the process operating locally. In the limit all the computation may be carried out for a single pixel from the pixels in its neighbourhood.

The invention therefore provides an efficient method for reconstructing a high quality image with the full sensor resolution in each of the red, green and blue colour channels.

The invention claimed is:

1. A method of de-mosaicing an image mosaic to form a full colour image, the image mosaic being composed of a plurality of image pixels and each image pixel having one of at least three colour values and having a luminance value representing the intensity of the colour value for that pixel in the image mosaic, the pixels of each colour value being interleaved across the image mosaic with pixels of different colour values to form the image mosaic, the method comprising the steps of:
   i) for each colour value, generating from the pixels for that colour value a low spatial frequency monochrome image;
   ii) for each colour value, generating from the pixels for that colour value a high spatial frequency luminance image that extends only across pixel locations of the image mosaic for that colour value;
   iii) combining each of the high spatial frequency luminance images with each of the corresponding low spatial frequency monochrome images to form the full colour image.

2. A method as claimed in claim 1, comprising the step of combining the three or more high spatial frequency images to form a high spatial frequency luminance image that extends across all pixel locations of the image mosaic.

3. A method as claimed in claim 1, in which in step i) the low spatial frequency monochrome image extends across all pixel locations of the image mosaic.

4. A method as claimed in claim 1, in which in step i) the low spatial frequency monochrome image is calculated separately in local areas of the image mosaic.

5. A method as claimed in claim 1, comprising the steps of:
   iv) forming a plurality of mosaic data sets, one for each colour value, and each such data set comprising elements that represent the luminance values of the pixels which have the corresponding colour value;
   v) generating, from each image mosaic data set, a smoothed image data set representative of the corresponding low spatial frequency monochrome image, and each such data set comprising elements that represent smoothed luminance values across all pixel locations of the image mosaic;
   vi) generating, from each image mosaic data set, an image data set representative of the corresponding high spatial frequency image, and each such data set comprising elements that represent high frequency luminance values of the pixels which have the corresponding colour value;

vii) combining each high frequency image data with a smoothed image data set to form a plurality of de-mosaiced image data sets, one for each colour value, and each such data set comprising elements that represent de-mosaiced luminance values of the pixels which have the corresponding colour value.

6. A method as claimed in claim 1, in which each of the low spatial frequency monochrome images is formed by two-dimensional interpolation combined with low pass filtering.

7. A method as claimed in claim 1, in which each of the high spatial frequency images is formed for each of the colour values from a difference between the luminance values of the image mosaic pixels for said colour value and corresponding portions of the low spatial frequency monochrome image for said colour value.

8. A method as claimed in claim 1, in which additional gain is applied to the high frequency image prior to combining it with the smoothed image data for each colour value in order to sharpen the resulting full colour image.

9. A method as claimed in claim 1, in which the full colour image is formed for each of the colour values by summing each of the high spatial frequency images with corresponding portions of the low spatial frequency monochrome images for said colour value.

10. A method as claimed in claim 1, in which there are three colour values, namely red, green and blue, and there is a predominance of pixels having a green colour value.

11. A method as claimed in claim 10, in which the colour values of pixels in the image mosaic are arranged in a Bayer pattern.

12. A method as claimed in claim 1, wherein the step of combining comprises addition of each of the high spatial frequency luminance images to a corresponding low spatial frequency monochrome images to form the full colour image.

13. A device for de-mosaicing an image mosaic to form a full colour image, the device comprising a processor, software, and a memory, in which the memory stores image mosaic data representative of an image mosaic having a plurality of image pixels, said image mosaic data including for each pixel one of at least three colour values and a luminance value representing the intensity of the colour value for that pixel in the image mosaic, the pixels of each colour value being interleaved across the image mosaic with pixels of different colour values to form the image mosaic, wherein the processor, software and memory are operable to:
a) generate from the image mosaic data, for each colour value, smoothed image data representative of a low spatial frequency monochrome image;
b) generate from the image mosaic data, for each colour value, image data representative of a high spatial frequency image for that colour value that extends only across pixels locations of the image mosaic for that colour value;
c) combine the high frequency image data with the smoothed image data for each colour value to form de-mosaiced image data representative of the full colour image.

14. A device as claimed in claim 12, wherein the processor, software and memory are operable to combine the high frequency image data from the three or more colour values to form composite high frequency image data representative of a high spatial frequency luminance image that extends across all pixel locations of the image mosaic.

15. A device as claimed in claim 13, wherein the processor, software and memory are operable to form each of the high spatial frequency images for each of the colour values from a difference between the luminance values of the image mosaic pixels for said colour value and corresponding portions of the low spatial frequency monochrome image for said colour value.

16. A device as claimed in claim 13, wherein the processor, software and memory are operable to:
d) form a plurality of mosaic data sets, one for each colour value, and each such data set comprising elements that represent the luminance values of the pixels which have the corresponding colour value;
e) generate, from each image mosaic data set, a smoothed image data set representative of the corresponding low spatial frequency monochrome image, and each such data set comprising elements that represent smoothed luminance values across all pixel locations of the image mosaic;
f) generate, from each image mosaic data set, sri image data set representative of the corresponding high spatial frequency image, and each such data set comprising elements that represent high frequency luminance values of the pixels which have the corresponding colour value;
g) combine each high frequency image data with a smoothed image data set to form a plurality of de-mosaiced image data sets, one for each colour value, and each such data set comprising elements that represent de-mosaiced luminance values of the pixels which have the corresponding colour value.

17. A device as claimed in claim 13, wherein the processor, software and memory are operable to form each of the low spatial frequency monochrome images is formed by two-dimensional interpolation combined with low pass filtering.

18. A device as claimed in claim 13, wherein the processor, software and memory are operable to apply additional gain and to the high frequency image prior to combining it with the smoothed image data for each colour value in order to sharpen the resulting full colour image.

19. A device as claimed in claim 13, wherein the processor, software and memory are operable to form the full color image for each of the colour values by summing each of the high spatial frequency images with corresponding portions of the low spatial frequency monochrome images for said colour value.

20. The device of claim 13 wherein the combining operation comprises adding each of the high spatial frequency luminance images to a corresponding low spatial frequency monochrome images to form the full colour image.

* * * * *

UNITED STATES PATENT AND TRADEMARK OFFICE
CERTIFICATE OF CORRECTION

| | | |
|---|---|---|
| PATENT NO. | : 7,071,978 B2 | Page 1 of 1 |
| APPLICATION NO. | : 09/906625 | |
| DATED | : July 4, 2006 | |
| INVENTOR(S) | : Andrew Arthur Hunter et al. | |

It is certified that error appears in the above-identified patent and that said Letters Patent is hereby corrected as shown below:

In column 10, line 26, in Claim 16, delete "sri" and insert -- an --, therefor.

Signed and Sealed this

Seventeenth Day of March, 2009

JOHN DOLL
*Acting Director of the United States Patent and Trademark Office*